Oct. 24, 1967  E. S. STEVENS ET AL  3,348,501
SLIDING GATE HOPPER CAR DISCHARGE STRUCTURE
Filed Oct. 19, 1965  3 Sheets-Sheet 1

INVENTORS.
ERIC S. STEVENS
WILLARD E. KEMP
BY *Eugene N. Riddle*

ATTORNEY

United States Patent Office 3,348,501
Patented Oct. 24, 1967

3,348,501
SLIDING GATE HOPPER CAR DISCHARGE STRUCTURE
Eric S. Stevens, St. Charles, and Willard E. Kemp, Bridgeton, Mo., assignors to ACF Industries, Incorporated, New York, N.Y., a corporation of New Jersey
Filed Oct. 19, 1965, Ser. No. 497,642
8 Claims. (Cl. 105—248)

ABSTRACT OF THE DISCLOSURE

A bottom outlet structure beneath a hopper and having a movable lower discharge structure positioned beneath a sliding gate. The gate support means supports the lower discharge structure for movement in a generally horizontal plane beneath the area utilized by the movement of the gate and between a closed or operable position in which a discharge of lading is permitted through both the gate opening and the lower discharge structure, and an open or inoperable position in which the lower discharge structure is removed from beneath the gate opening and a discharge of lading is permitted only through the gate opening upon opening of the gate. The lower discharge structure may be releasably connected to the gate for simultaneous movement therewith upon operation of a common drive means.

Background and description of the invention

Many covered hopper cars have bottom discharge outlets positioned adjacent each side of the railway car and some unloading sites have canvas hoods or the like which fit about the discharge outlets adjacent the sides of the car. The side discharge outlets in many instances are of conventional dimensions, such as thirteen (13) inches by twenty-four (24) inches, and are normally arranged in a side-by-side relation to each other. The lading is conveyed from the railway car into a storage bin or facility normally positioned adjacent the unloading site.

At present, the trend in bottom discharge structures is in the direction of larger discharge outlets which extend the width of the car and are positioned in the center of the track centrally of the width of the car. For example, bottom discharge outlets of dimensions, such as twenty-seven (27) inches by sixty-three (63) inches, are employed today in some covered hopper cars. When the larger discharge outlets are employed at unloading sites which are adapted for unloading from the smaller sized bottom outlets, it is necessary to have an adaptor or the like in order to fit about the larger sized discharge opening.

The present invention provides a bottom discharge structure having a gate movable back and forth between open and closed positions for a gravity discharge of lading, a chute beneath the gate having a pair of side-by-side discharge openings, means to permit the chute to move selectively with the gate to an open position thereby to permit a gravity discharge of lading from a single relatively large discharge opening, and means to selectively retain the chute in a relatively fixed position when the gate is opened to permit a gravity discharge of lading through the chute from two relatively small discharge openings in two separate streams. Such an arrangement permits a small canvas hood at the unloading site to be employed in the event a large sized hood or an adaptor is not available.

It is an object of the present invention to provide a bottom outlet structure having a gate for a gravity discharge of lading and means to permit the lading to be discharged selectively from either a single relatively large discharge opening or from a pair of relatively small side-by-side discharge openings.

The invention accordingly comprises the constructions hereinafter described, the scope of the invention being indicated in the following claims.

In the accompanying drawings, in which one of various possible embodiments of the invention is illustrated, FIGURE 1 is a side elevation of a covered hopper railway car having a plurality of bottom outlet structures comprising the persent invention;

Corresponding reference characters indicate corresponding parts throughout the several views of the drawings.

Figure 1:
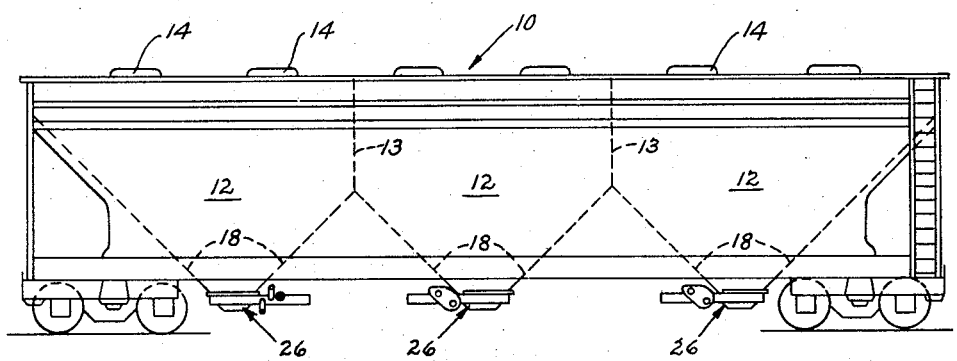

Referring now to the drawings for better understanding of the invention, a covered hopper railway car is indicated generally at 10 and includes a plurality of hoppers 12 separated by bulkheads 13. Hatch covers 14 permit the loading of hoppers 12 through suitable openings. Hopper sides 16 and 18 funnel downwardly to bottom discharge openings 20 each being defined by an outwardly extending flange 22 extending about the periphery of each opening 20.

Figure 7:
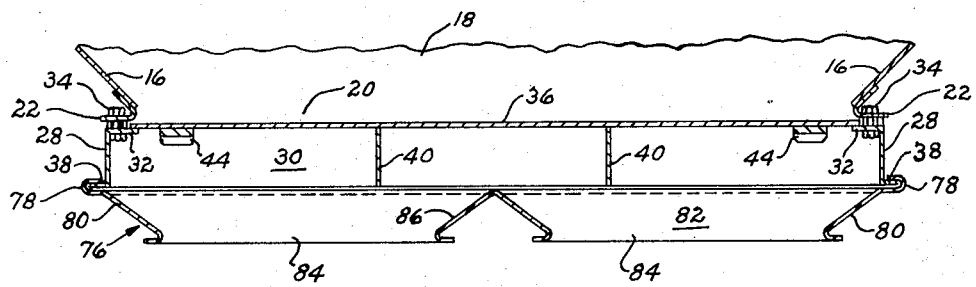
FIGURE 7 is a section taken generally along line 7—7 of FIGURE 3.
Figure 3:
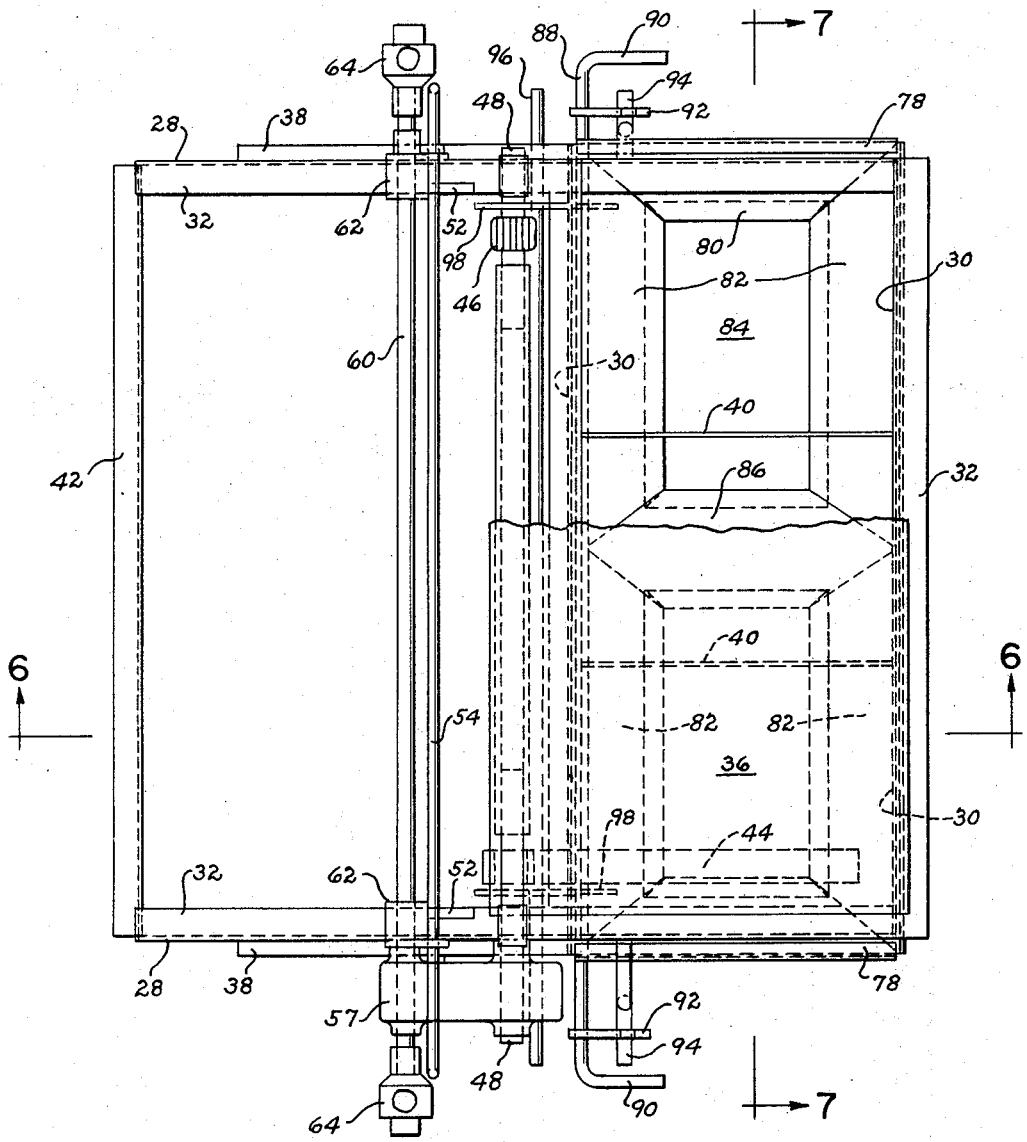
FIGURE 3 is a top plan of the bottom outlet structure shown in FIGURE 2, a portion of the gate being broken away.

Mounted beneath each hopper 12 is a bottom outlet structure indicated generally 26. Each outlet structure has a frame generally designated 27 comprising longitudinal frame members 28 connected by transverse frame members 30. Frame members 28 and 30 have upper flanges 32 positioned adjacent flange 22 and secured thereto by suitable bolt and nut combinations 34 for supporting frame 27. Longitudinal frame members 28 extending outwardly from the associated hopper discharge opening 20 and provide a support for a gravity gate 36 when moving between open and closed positions. An end transverse frame member 42 connects the extending ends of longitudinal frame members 28. Each longitudinal frame member 28 has a lower outwardly extending lip 38 as shown in FIGURES 3 and 7. Stiffeners 40 are secured between transverse frame members 30 and support gate 36 when in a closed position.

Figure 2:
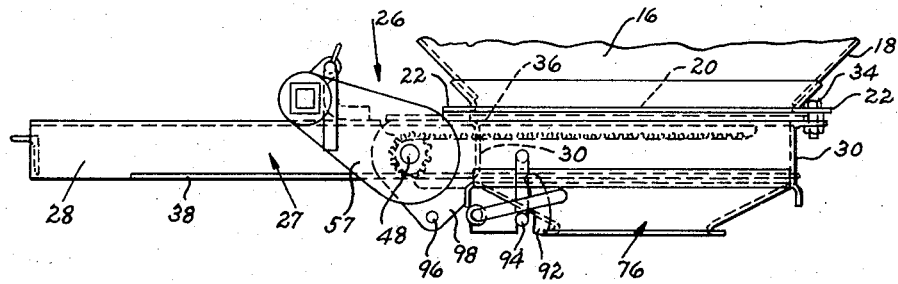
FIGURE 2 is an enlarged side elevation of a bottom outlet structure of FIGURE 1 showing the gate in a closed position with a discharge chute beneath the gate.

Secured to the underside of gate 36 are racks 44 in engagement with pinions 46 secured to shaft 48. Shaft 48 is supported by longitudinal frame members 28 and remains in a relatively fixed position upon movement of gate 36 between open and closed positions. To retain gate 36 in a closed position and to prevent inadvertent movement of gate 36, stops 52 are mounted on a rod 54 supported from frame 27 and are adapted to engage the adjacent edge of gate 36 upon movement of the gate from closed position as shown in FIGURE 2. When desired to open gate 36, rod 54 may be pivoted as shown in FIGURES 4 and 5 to move stops 52 away from the adjacent edge of gate 36.

Figure 8:
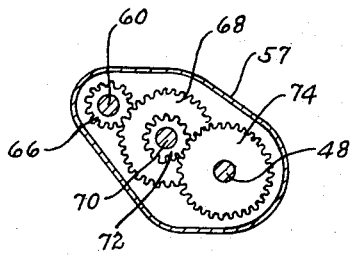
FIGURE 8 is a generally diagrammatic view of the gear reduction mechanism for moving the gate between open and closed positions.

Referring particularly to FIGURE 8, a reduction gear mechanism within a gear box or housing 57 is illustrated for rotation of shaft 48 and movement of gate 36. Since gate 36 is of relatively large dimensions, such as twenty-seven (27) inches by sixty-three (63) inches, a relatively large leverage or torque is required to rotate shaft 48. The arrangement shown in FIGURE 8 provides a mechanical advantage of around six to one thereby requiring only a relatively small force to rotate shaft 48. A drive shaft 60 is mounted on journals 62 carried by frame 27. A capstan 64 adjacent each end of shaft 60 permits rotation of shaft 60 by a suitable handspike or the like. A spur gear 66 on shaft 60 engages an idler gear 68 on stub shaft 70. Spur gear 72 on stub shaft 70 engages spur gear 74 on shaft 48 for rotation of shaft 48 and pinions 46 to move gate 36.

Mounted beneath gate 36 and forming an important feature of this invention, a movable chute or lower discharge structure is indicated generally at 76. As shown particularly in FIGURES 3 and 7, chute 76 has inturned flanges 78 on opposite ends thereof which fit over and ride along lips 38 for supporting chute 76. End slope sheets 80 of chute 76 are connected by side slope sheets 82. Dividing chute 76 into a pair of side-by-side discharge openings 84 is an inverted V-shaped divider 86 extending between and secured to side slope sheets 82. Carried by chute 76 is a pivot rod 88 having a handle 90 mounted on each end thereof. A generally T-shaped selector 92 is mounted adjacent each end of rod 88 and is adapted to engage, selectively, a crank-shaped detent 94 projecting from the adjacent longitudinal frame member 28 or a detent 96 carried by an adjacent lower extension 98 of gate 36.

Figure 4:
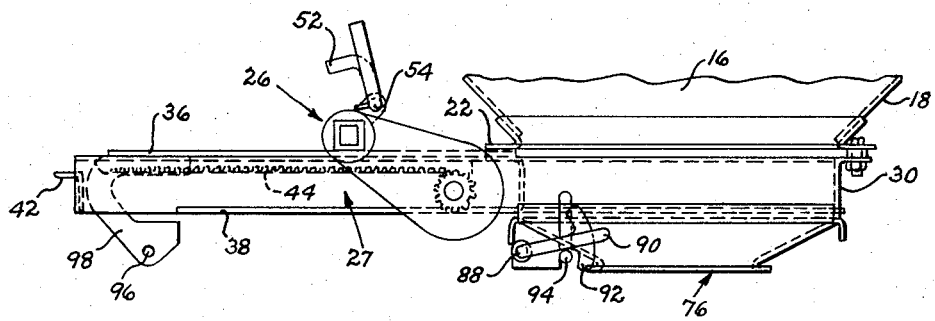
FIGURE 4 is a side elevation similar to FIGURE 2 but showing the gate in an open position with the chute remaining in position beneath the hopper structure to discharge the lading in two separate streams through a pair of side-by-side discharge openings.
Figure 5:
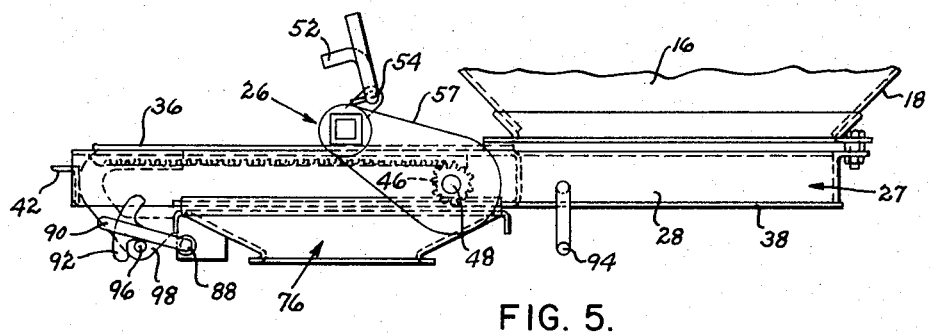
FIGURE 5 is a side elevation similar to FIGURE 2 but showing both the gravity gate and chute moved to an open position for discharging the lading through a single relatively large discharge opening.
Figure 6:
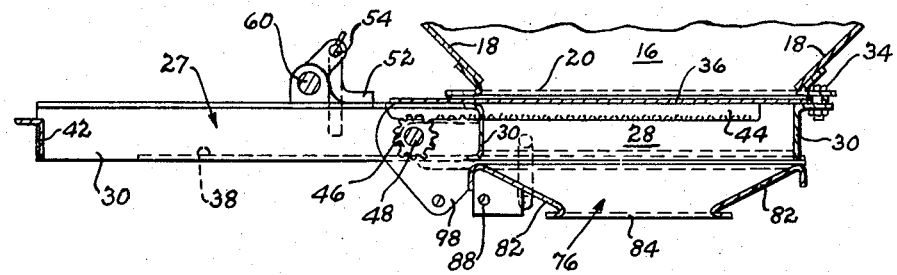
FIGURE 6 is a section taken generally along line 6—6 of FIGURE 3.

If it is desired to discharge the lading in two separate streams through the relatively small side-by-side discharge openings 84 of chute 76, selectors 92 are swung to the position shown in FIGURES 2 and 4 to engage detents 94 secured to frame 27. Then, rod 54 is rotated to move stops 52 to the position of FIGURE 4 permitting gate 36 to open. In this position, shaft 60 is rotated by a suitable handspike or the like engaging capstan 64 to rotate pinions 46 and move gate 36 to the position shown in FIGURE 4. Chute 76 is retained in position beneath discharge opening 20 by the engagement of selectors 92 with detents 94 and the lading is discharged through side-by-side openings 84.

If it is desired to discharge lading through a single large opening 20, selectors 92 are swung by a handle 90 to the position shown in FIGURE 5 engaging detents 96 carried by extensions 98 of gate 36. Upon rotation of shaft 60 and pinions 46 to open gate 36, detents 96 engage selectors 92 to move chute 76 along lips 38, chute 76 being supported on lips 38 by inturned flanges 78 and riding along lips 38. Thus, chute 76 is removed from beneath discharge opening 20 and the lading is discharged through a single relatively large opening.

From the foregoing, a lower discharge structure or chute having a pair of side-by-side openings has been illustrated for selective movement with a gravity discharge gate to permit lading to be discharged selectively from a single relatively large discharge opening formed by the gravity gate or from a pair of relatively small side-by-side discharge openings formed by the chute. While the chute has been illustrated as having a pair of side-by-side openings, it is to be understood that the chute may be formed with other openings, if desired, such as a single small discharge opening.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A bottom outlet structure adapted to be secured beneath a hopper structure for the discharge of lading and comprising, a first discharge structure including a gate and support means on which the gate is mounted for sliding movement from one side of the hopper structure in a generally horizontal plane between open and closed positions to control the flow of lading through the first discharge structure, means to slide said gate in said generally horizontal plane between its open and closed positions, a second discharge structure mounted beneath said first discharge structure and adapted to receive lading therefrom, and means supporting said second discharge structure for movement in a generally horizontal direction only from said one side of the hopper structure in an area generally vertically coextensive with the area utilized by the movement of the gate and between an operable position beneath the first discharge structure and an inoperable position removed from beneath the first discharge structure, said second discharge structure being movable selectively between operable and inoperable positions to permit a discharge through both said first and second discharge structures when the gate is open and the second discharge structure is in operable position, and to permit a discharge of lading only through the first discharge structure when the gate is open and the second discharge structure is in inoperable position.

2. A bottom outlet structure adapted to be secured beneath a hopper structure for the discharge of lading and comprising, a first discharge structure including a generally rectangular gate and support means on which the gate is mounted for sliding movement from one side of the hopper structure in a generally horizontal plane between open and closed positions to control the flow of lading through the first discharge structure, means to slide said gate in said generally horizontal plane between its open and closed positions, a second discharge structure carried by said gate support means beneath said first discharge structure and adapted to receive lading therefrom, said gate support means supporting said second discharge structure for sliding movement in a generally horizontal plane only from said one side of the hopper structure and between an operable position beneath the first discharge structure and an inoperable position removed from beneath the first discharge structure, said second discharge structure being movable selectively between operable and inoperable positions to permit a discharge through both said first and second discharge structures when the gate is open and the second discharge structure is in operable position, and to permit a discharge of lading only through the first discharge structure when the gate is open and the second discharge structure is in inoperable position.

3. A bottom outlet structure adapted to be secured beneath a hopper structure for the discharge of lading and comprising, a gate, support means on which the gate is supported for sliding movement from one side of the hopper structure in a generally horizontal plane and forming a gate discharge opening, a lower discharge structure carried by said gate support means for sliding movement from said one side of the hopper structure in a generally horizontal plane and adapted to receive lading through said gate discharge opening, and means to slide said gate and said discharge structure in generally parallel horizontal planes along said gate support means between open and closed positions relative to said gate discharge opening, said means permitting selective independent sliding movement of said gate between open and closed positions relative to said lower discharge structure, said lower discharge structure in closed position being beneath said gate discharge opening and permitting a discharge through both said gate discharge opening and said lower discharge structure when the gate is in open position, said lower discharge structure in open position being removed from beneath said gate discharge opening and permitting a discharge of lading only through said gate discharge opening when the gate is in open position.

4. A bottom outlet structure adapted to be secured beneath a hopper structure for the discharge of lading and comprising, a gate, support means on which the gate is supported for sliding movement in a generally horizontal plane and forming a gate discharge opening, a lower discharge structure mounted beneath said support means for sliding movement in a generally horizontal plane and adapted to receive lading through said gate discharge opening, common drive means to slide said gate and said discharge structure simultaneously in generally horizontal planes along said support means between open and closed positions relative to said gate discharge opening, and disconnectable means between the gate and said discharge structure to permit selective independent sliding movement of said gate between open and closed positions relative to said lower discharge structure upon operation of said common drive means, said lower discharge structure in closed position being beneath said gate discharge opening and permitting a discharge through both said gate discharge opening and said lower discharge structure when the gate is in open position, said lower discharge structure in open position being removed from beneath said gate discharge opening and permitting a discharge of lading only through said gate discharge opening when the gate is in open position.

5. A bottom outlet structure adapted to be secured beneath a hopper structure for the discharge of lading and comprising, a gate, support means on which the gate is supported for movement in a generally horizontal plane between open and closed positions and forming a gate discharge opening beneath the gate, a lower discharge structure carried by said support means and mounted for movement thereon in a generally horizontal plane, common drive means to move said gate and discharge structure in generally horizontal planes between open and closed positions relative to said gate discharge opening, cooperating parts on said gate and lower discharge structure manually movable between a connected position to connect said gate and discharge structure together for said simultaneous movement upon operation of said drive means and a disconnected position for independent movement of said gate relative to said lower discharge structure upon operation of said drive means, said lower discharge structure in closed position being beneath said gate discharge opening and permitting a discharge through both said gate discharge opening and said lower discharge structure when the gate is in open position, said lower discharge structure in open position being removed from beneath said gate discharge opening and permitting a discharge of lading only through said gate discharge opening when the gate is in open position.

6. A bottom outlet structure as set forth in claim 5 wherein said drive means comprises an interfitting rack and pinion positioned between said gate and said support means for moving the gate between open and closed positions, and power means to assist in the movement of the gate between open and closed positions.

7. A bottom outlet structure as set forth in claim 6 wherein said rack is carried by said gate and said pinion is positioned on said support means, said power means comprising a reduction gear structure operatively connected to said pinion to assist in the rotation of the pinion.

8. A covered hopper railway car for unloading lading selectively, from two separate discharge streams or a single discharge stream, said railway car comprising a hopper structure having sides funneling downwardly to a single discharge opening, a generally rectangular gate beneath the hopper structure slidable back and forth in a generally horizontal plane between open and closed positions relative to said single discharge opening, a frame beneath the gate on which the gate is supported for back and forth movements, means to slide said gate between open and closed positions in said generally horizontal plane, a discharge structure supported by the frame beneath the single discharge opening and having sides funneling downwardly into at least two spaced adjacent bottom discharge openings to permit when the gate is opened a discharge of lading in two separate discharge streams, and means releasably connecting the discharge structure to the gate for mounting said chute for selective horizontal sliding movement of the discharge structure with the gate in an area generally vertically coextensive with the gate thereby to remove the discharge structure from beneath the single discharge opening to permit discharge of lading only from a single discharge stream.

References Cited
UNITED STATES PATENTS

| | | | |
|---|---|---|---|
| 197,307 | 11/1877 | Anderson | 105—282 X |
| 718,742 | 1/1903 | Umholtz | 105—247 |
| 833,761 | 10/1906 | Stevens | 105—247 X |
| 938,976 | 11/1909 | Clark | 105—307 X |
| 2,393,932 | 1/1946 | Petroe | 214—44 |
| 2,564,020 | 8/1951 | Mengel | 214—83.26 |
| 2,751,860 | 6/1956 | Dath | 105—282 |
| 2,751,861 | 6/1956 | Withall | 105—282 |
| 2,751,862 | 6/1956 | Dorey | 105—282 X |
| 2,844,411 | 6/1958 | Aller | 302—51 |
| 3,270,921 | 9/1966 | Nadolske et al. | 222—132 |

ARTHUR L. LA POINT, *Primary Examiner*.

H. BELTRAN, *Assistant Examiner*.